United States Patent [19]
Casto

[11] 3,753,585
[45] Aug. 21, 1973

[54] TRENCHDUCT CONNECTOR UNITS

[75] Inventor: John P. Casto, Vienna, W. Va.

[73] Assignee: Textran Inc., Providence, R.I.

[22] Filed: Apr. 7, 1972

[21] Appl. No.: 242,070

[52] U.S. Cl.......... 287/189.36 R, 52/221, 138/159, 174/48
[51] Int. Cl............................................ E04f 17/08
[58] Field of Search ............... 52/220, 221; 174/48, 174/101; 285/150, 156, 406; 220/3.3, 3.94; 138/159

[56] References Cited
UNITED STATES PATENTS

| | | | |
|---|---|---|---|
| 1,590,569 | 6/1926 | Fisk | 52/221 X |
| 3,023,032 | 2/1962 | Johnston et al | 285/156 |
| 3,530,627 | 9/1970 | Carter et al | 174/101 X |
| 3,550,336 | 12/1970 | Halkovich et al | 52/127 |
| 3,577,863 | 5/1971 | Hudnall | 52/220 |
| 3,603,625 | 9/1971 | Cottrell | 52/221 X |

Primary Examiner—Alfred C. Perham
Attorney—Frederick J. Olsson

[57] ABSTRACT

Units for connecting trenchduct runs arranged in T or X or L type patterns. A unit has specially configured sides providing side and end openings for alignment with the trench runs together with specially configured couplers compatible with the conventional coupling devices on the trench. The units may be constructed for either single or double adjust trench.

6 Claims, 5 Drawing Figures

Patented Aug. 21, 1973
3,753,585
3 Sheets-Sheet 1
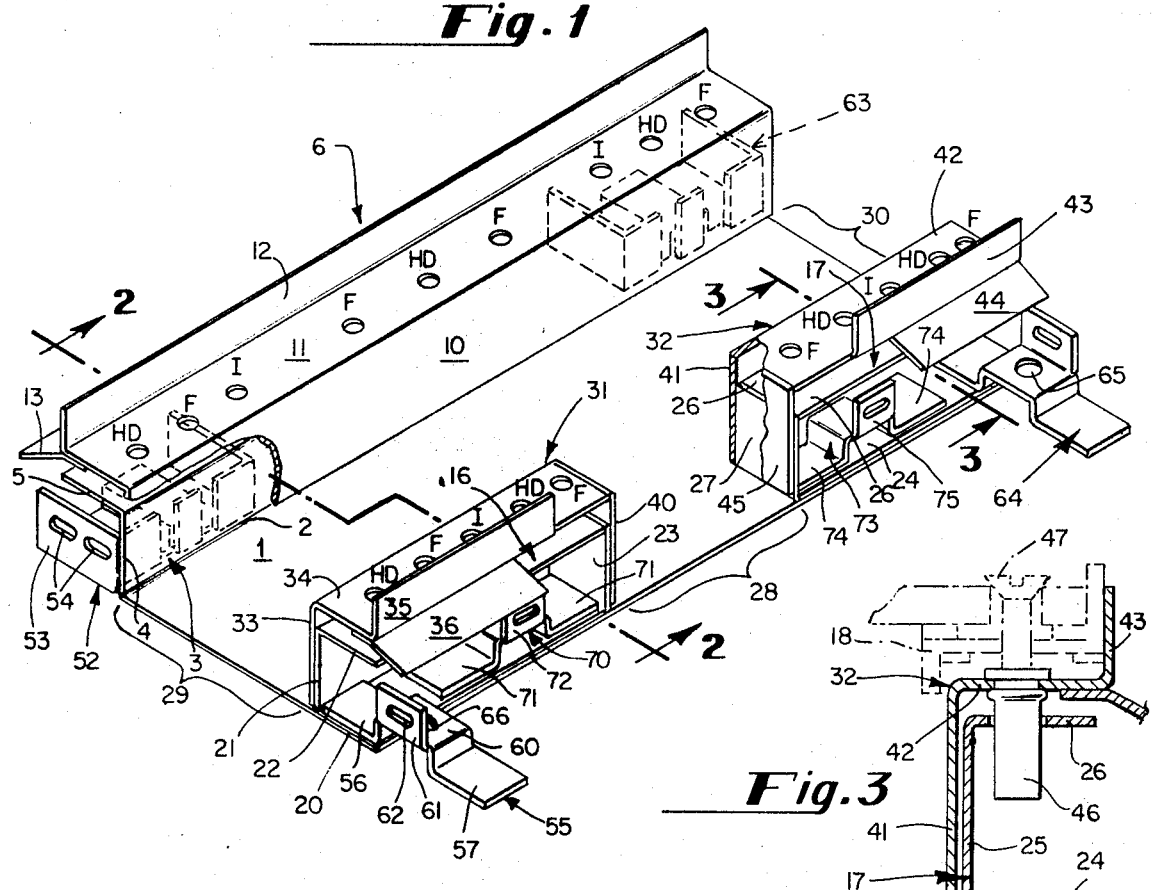
Fig.1
Fig.3
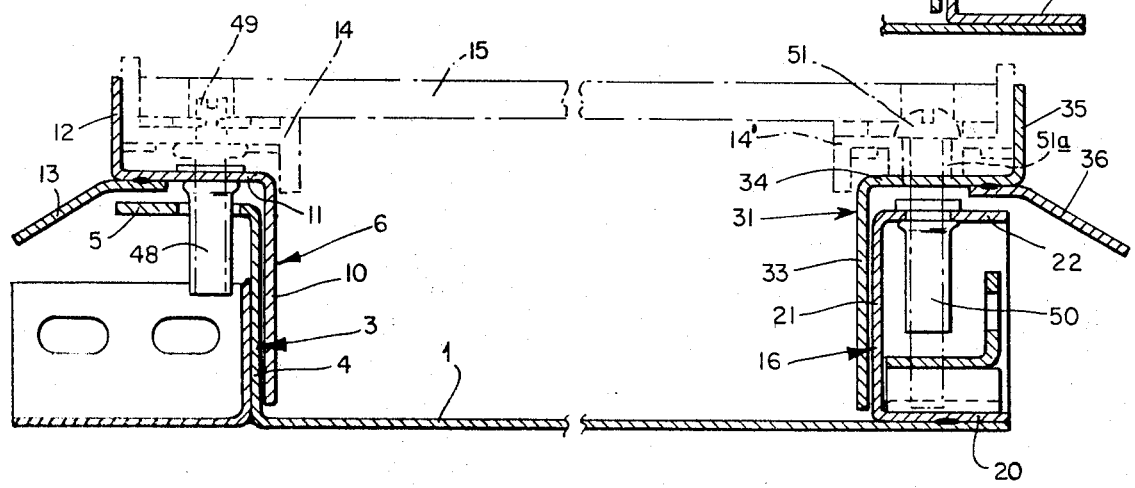
Fig.2

Patented Aug. 21, 1973

Patented Aug. 21, 1973 3,753,585

TRENCHDUCT CONNECTOR UNITS

This invention relates in general to electrical underfloor distribution systems and in particular relates to improved connector units for joining trench sections arranged in T or X or L type patterns.

According to the invention, a connector unit comprises a short body having a cross sectional shape the same as the trench with which the unit is used. The connector has end and side openings the number of which depends upon the trench run configuration with which the unit is to be used. On the end and side openings there are devices which are coupled with conventional trench coupling devices on the trench runs to secure the unit and trench together.

There are two objectives of the invention. The first is to provide a connector unit which is rectangular in shape rather than an actual T, X or L shape and constructed of components which, with slight modification, can provide a unit for use with single adjust trenches or a unit for use with double adjust trenches. The other is to provide a trench connector constructed of components which with slight modification, can make a unit for use with single and double adjust trenches together with novel couplers constructed so as to be useable on side and on end openings and in either position being compatible with the conventional coupling devices used on trench runs.

The invention will be described below in connection with the following drawings wherein:

FIG. 1 is a perspective view showing the invention as adapted for a T-type connector for use with double adjust trench;

FIG. 2 is an enlarged cross sectional elevational view taken along lines 2—2 of FIG. 1 and illustrating initial and final adjusting arrangements in a double adjust trench;

FIG. 3 is an enlarged cross sectional elevational view taken along lines 3—3 of FIG. 1 and illustrating a cover hold-down arrangement in a double adjust trench;

Figure 4:
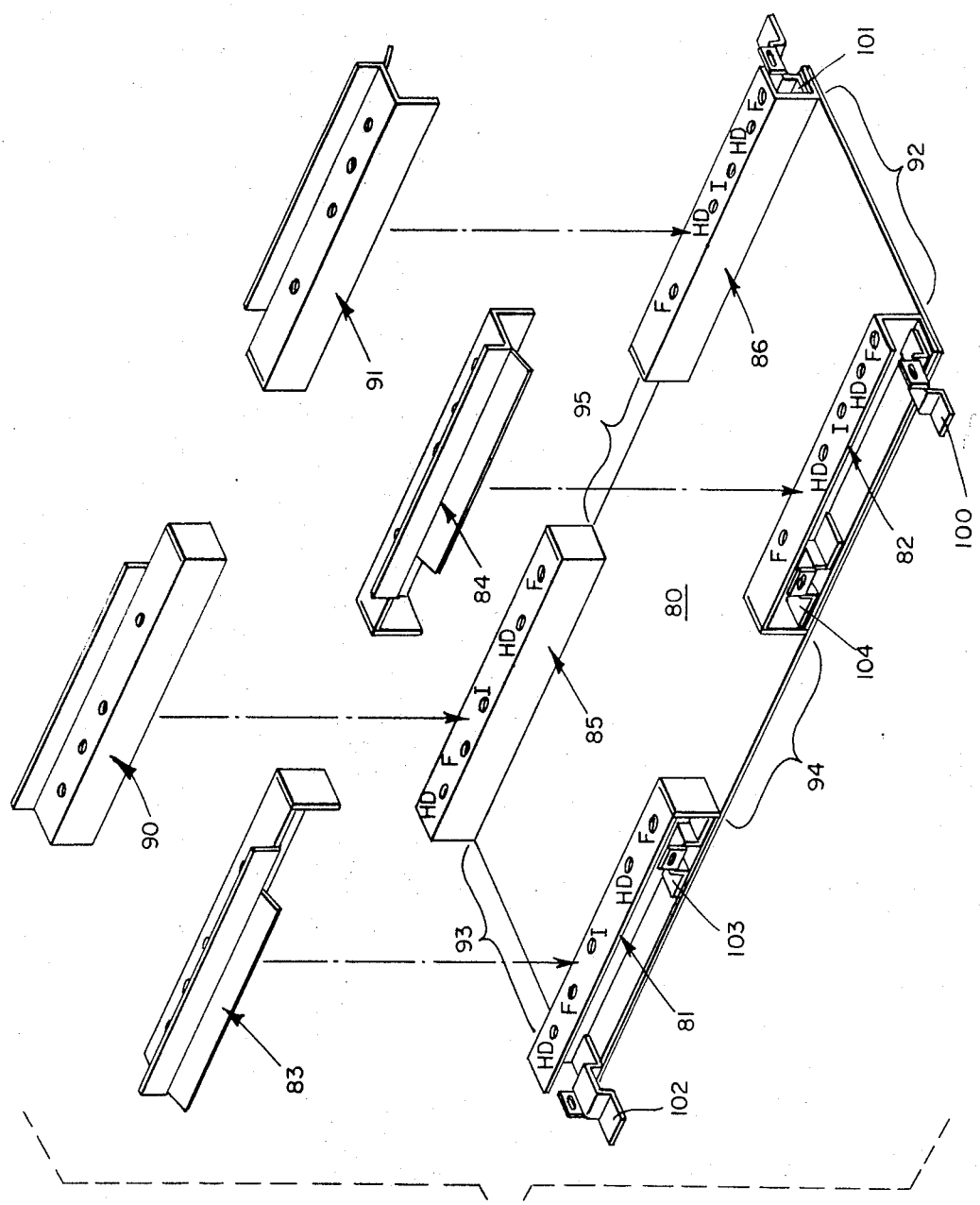
FIG. 4 is an exploded perspective view showing the invention as adapted for an X-type connector for use with double adjust trench.

While the invention is shown with relation to connecting units for use with double adjust trench, those skilled in the art will readily understand from information provided in the description hereinafter how the components are modified to adapt the connector for a single adjust trench.

In FIG. 1 the T-type connector has a flat, rectangular shaped base 1. On the left hand edge 2 is a side piece 3. The side piece 3 comprises a riser 4 extending normally upwardly from the base, horizontal flange 5 which extends outwardly from the top of the riser parallel with the base. The riser and flange are integral with the base by that an extension of the base having previously been bent into the shape shown.

Overlying the side piece 3 is a side rail 6 which is co-extensive with the side piece 3. The side rail has a side leg 10 which is closely adjacent to and parallel to riser 4. A horizontal flange 11 overlies the flange 5 and a screed flange 12 extends vertically upwardly from the flange 11. Anchor strip 13 is connected to the flange 11. The trench structure includes a reversible Z-bar 14 (FIG. 2) supported (as will be explained later) on flange 11 of the side rail 6. A similar Z-bar 14' is mounted on the other side of the trench. The Z-bars mount cover 15.

On the right hand side of the base carries the side pieces 16 and 17 which extend generally parallel the side piece 3.

The side piece 16 is made from a single piece of sheet metal cut and bent into the shape indicated. The side piece has a foot section 20 welded to the base 1, a riser 21 extending upwardly from the inner edge of the foot and normal to the base and a flange 22 extends from the top of the riser overlying the foot and co-planar with the flange 5. The riser 21 has a portion 23 which is bent back in the direction of the foot 20 and the flange 22 so as to be co-extensive therewith and to extend therebetween.

The side piece 17 has the same construction as the piece 16 being made from a single piece of sheet metal cut and bent into the shape indicated. The side piece has a foot section 24 welded to the base 1, riser 25 extending upwardly from the inner edge of the foot and normal to the base and a flange 26 co-planar with the flange 22. The riser 25 has a portion 27 bent back in the direction of the foot 24 and the flange 26 and extending therebetween. The bent-back portion 23 and the bent-back portion 27 are parallel to one another and being spaced apart form a side opening 28 for alignment with the trench to which the connector unit will be secured.

Overlying the side piece 16 is a side rail 31 and overlying the side piece 17 is the side rail 32. Side rails are coextensive with the respective side pieces.

The side rail 31 has a side leg 33 (FIG. 2) which is closely adjacent to and parallel the riser 21. A horizontal flange 34 overlies the flange 22 and has a screed flange 35 extending vertically upwardly from the flange 11. An anchor strip 36 is welded to the flange 34. The side leg 33 has a portion 40 which is bent back and extends closely adjacent, parallel and co-extensive with the bent-back portion 23.

The side rail 32 has a side leg 41 (FIG. 3) which is closely adjacent and parallel to the riser 25. A horizontal flange 42 overlies the flange 26 and a screed flange 43 extends vertically upwardly from the flange 42. An anchor strip 44 is welded to the flange 42. The side leg 41 has a portion 45 bent back and extending closely adjacent to and parallel the bent-back portion 27.

The bent-back portion 40 and the bent-back portion 45 extend into the opening 28. Also it will be observed that the leg 10 on the side rail 6 and the leg 33 on the side rail 31 extend into the opening 29 and further that the leg 10 on the side rail 6 and the leg 41 on the side rail 32 extend into the opening 30.

The connector unit has the same cross sectional shape as the trench with which it is to be used. For example, when the opening 29 is aligned with double adjust trench to which it is to be secured, the bottom or base 1, the risers 4 and 21 and the flanges 5 and 22 are aligned with corresponding pieces in the trench. Further, the side rails 6 and 31 are similarly aligned with corresponding side rails on the trench. The same aligned condition prevails when the trench connections are made to the openings 29 and 30.

With a double adjust trench it will be understood that the side rails 6, 31 and 32 are mounted on respective side pieces so that the rails may be vertically adjusted before or during a pour of the concrete (initial adjust)

and that the Z-bars 14 and 14' and cover 15 are mounted on the side rails so that the Z-bars and the cover can be vertically adjusted after the concrete is hardened (final adjustment).

Typical arrangements for effecting such adjustments are shown in U.S. Pat. No. 3,550,336 assigned to the assignee of this invention and reference may be had to that patent for details. It will be sufficient therefore to show herein typical arrangements for obtaining initial and final adjustments.

For the initial adjustment, the cover, the Z-bar and the side rails are all locked together and are adjusted vertically as a unit. These components are locked together by the cover hold-down screws. Thus, with reference to FIG. 3, the side rail flange 42 carries a Riv-Nut 46 and a screw 47. Also, the side rail flange carries Riv-Nut 48 and adjusting screw 49 (left side of FIG. 2). The screw 49 supports the Z-bar which in turn supports the cover. It will be apparent that when the cover screw 47 is tightened, the cover, Z-bar and side rail are locked together by virtue of the screw 47 bearing on the cover and the screw 49 bearing on the Z-bar. A second hold-down arrangement is provided in the side rail 32 and similar arrangements in the side rails 31 and 6 as indicated by the letters HD and adjacent apertures which are the apertures for mounting the Riv-Nut assemblies.

For the initial adjust, the cover, Z-bar and side rail assembly are supported on vertical adjusting nuts and a typical arrangement is shown on the right hand side of FIG. 2. The flange 22 of side piece 16 carries the Riv-Nut 50 and the head of an adjusting screw 51 operating in the nut 50 supports the cover. A space 51' maintains the side rail flange tight against the underside of the head of screw 51. The screw 51 is turned by inserting a screw driver thru an aperture in the cover. Movement of the screw 51 moves the cover, Z-bar and side rail in a vertical direction. Similar initial adjusting arrangements are provided in side rails 31 and 6, the locations of the same being indicated by the letter I and adjacent apertures which are the apertures for accomodating the adjusting screw, the Riv-Nut being located in the side rail flange below the aperture.

For the final adjust the cover and Z-bars are supported so they can be vertically moved as a unit. Thus, as previously mentioned, the cover 15 and Z-bar 14 are supported by adjusting screw 49 operating in Riv-Nut 48 (fixed to flange 11 of the side piece 6). The screw 49 is operated to move the cover and Z-bar vertically by inserting a screw driver thru an aperture in the cover. Other similar final adjusts are provided in side rail 6 and in side rails 31 and 32, the locations of the same being indicated by the letter F and adjacent apertures which are the apertures for mounting Riv-Nut assemblies.

Figure 5:
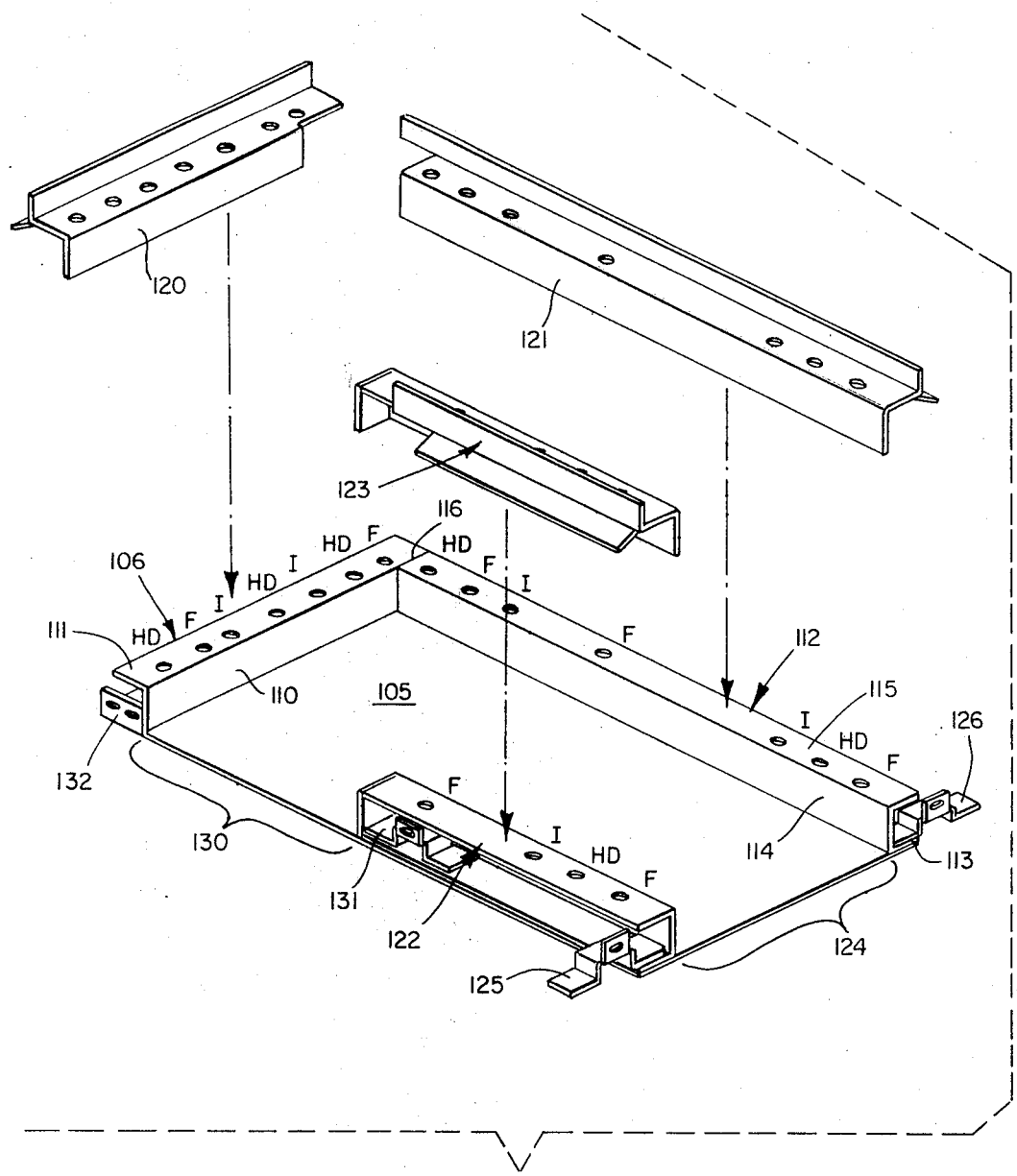
FIG. 5 is an exploded perspective view showing the invention as adapted for an L-type connector for use with double adjust trench.

The letters HD, F and I are used in FIGS. 4 and 5 to indicate location of structure for the respective functions as described.

One of the important features of the invention is the arrangement for coupling the connector unit to the trench runs. This is explained following:

Trenches with which the connector units of the invention are used are joined together with connecting devices of the kind shown in U.S. Pat. No. 3,577,863 assigned to the same assignee as the present invention. These devices cannot be used at each side and end opening location because of the double thickness created by the foot of a side piece superimposed on the base. Thus, a device placed on top of a foot would be vertically spaced with relation to the base to a greater degree than a corresponding device on the trench. The devices therefore would be vertically mis-aligned. To overcome this the invention contemplates a uniquely structured coupler which can be used without modification on either the X, T or L type units so as to nullify any alignment problem while at the same time permitting the use of the standard connecting devices where possible.

Referring to FIG. 1 and opening 29 a trench connecting device 52 is welded to the riser on one side of the opening. As will be apparent from U.S. Pat. No. 3,577,863, this is the position such a device occupies in a trench. The device 52 has a coupling flange 53 with bolt holes 54. The flange 53 is adapted to abut a corresponding coupling flange on a connecting device on the trench to which the connector unit is to be secured.

On the other side of the opening is disposed a coupler device 55. The coupler has a pair of spaced-apart, flat, co-planar legs 56 and 57. The leg is welded to the foot 20. A center section 60 is raised above the legs and has an upstanding coupling flange 61 provided with bolt holes 62. The surface of the flange 61 is co-planar with the surface of the flange 53 and both flanges being generally normal to the risers 4 and 21. The coupling flange 53 is adapted to abut a corresponding flange on the connecting device on the trench to which the connector is to be secured.

Bolt holes 54 and 62 in the flanges are vertically and horizontally spaced so as to be in alignment with the corresponding bolt holes in flanges in the abutting connecting devices. The aligned holes receive nut and bolt assemblies which secure the connector unit and trench together.

With reference to the opening 30 it will be observed that the same arrangement is provided, i.e., a connecting device 63 is welded to the riser 4 on one side of the opening and a coupler 64 is welded to the foot 24 on the other side of the opening. With respect to the couplers 55 and 64, the threaded apertures 65 and 66 are provided in the raised sections to accept adjusting screws in the event it is desired to use the coupler devices as a means for leveling the connecting unit. As it is pointed out in U.S. Pat. No. 3,577,863, the connecting devices 52 and 63 are provided with a similar means for leveling purposes.

At the opening 28 there are two coupling devices both of which are identical in size and shape to the couplers 55 and 64. The coupler 70 is disposed on one side of the opening in the space between the foot 20 and the flange 22 with at least one of the legs welded to the foot. The coupling device 73 on the other side of the opening is disposed in the space between the foot 24 and the flange 26 and at least one of its legs is welded to the foot. The coupling flange 75 is co-planar with the coupling flange 72. The coupling flanges 72 and 75 face outwardly for abutting corresponding coupling flanges on the connecting device on the trench to be secured at the opening 28.

The same idea relative to the side pieces, the side rails, the formed corners and the couplers as described above are applied in X and L type units. This is commented on below.

In FIG. 4 there is shown a connecting unit for joining intersecting trench runs oriented at right angles to each other. The configuration is called the X type. It will be seen that the unit is substantially identical to the T type unit described above, except that a side opening is provided on both sides.

In the unit of FIG. 4 the base 80 has side pieces 81 and 82 which correspond to the side units 16 and 17 of FIG. 1. The side rails 83 and 84 correspond to the side rails 31 and 32. The side pieces 85 and 86 are identical in construction to the side pieces 82 and 81 respectively. The side rails 90 and 91 are identical respectively to the side rails 84 and 83. The foregoing structure forms the end openings 92 and 93 and side openings 94 and 95.

In the embodiment of FIG. 4 the standard trench connecting devices (such as the device 52) are not used in that there is a double thickness in each of the end and side openings. Thus the couplers such as coupler 55 are employed at each opening. At the opening 92 there are the couplers 100 and 101 which are set up in the same way as explained in connection with the coupler 55. At the opening 93 there are identical couplers one of which is indicated at 102.

On the side opening 94 there are couplers 103 and 104 which are identical to the couplers 64 and 70. The opening 95 has similar couplers not shown.

With respect to the Riv-Nut assemblies for vertical adjustment, the arrangement used in FIG. 1 is incorporated in structure FIG. 4 as indicated by the letters I, F and HD.

In FIG. 5 the L type unit shown embodies the construction principle described previously.

The base 105 has a side wall 106 comprising the riser 110 and horizontal flange 11. The side wall is an extension of the base similarly as the side piece 3 of FIG. 1. The side piece 112 is formed similarly as the side pieces 6 and 17 of FIG. 1 and comprises the foot 113, the riser 114, the horizontal flange 115. Flanges 111 and 115 are preferably welded at 116.

The side rail 120 and the side rail 121 are constructed similarly to the side rails previously described.

The side piece 122 is similar to the side piece 17 and the side rail 123 is similar to the side rail 32.

On the end 124 the couplers 125, 126 are employed while on the end 130 is the coupler 131 and a connecting device 132 (similar to the device 52).

With respect to the initial and final vertical adjustment the arrangements of FIG. 1 are also employed. The various functions are indicated by the letters I, F and HD.

Before closing it is to be noted that whether the connecting unit is of the X or L or T type the same partakes of a boxlike shape with the only protrusions being when the couplers are used at an end opening position. Thus, the structure lends itself for packaging in the conventional shipping containers. This eliminates strapping the units to pallets for shipping purposes as occurs with the conventional connecting units which are actually shaped in the form of an L or a T or an X. This packaging feature results in considerable savings in material and in labor.

Furthermore, the various structures described provide for manufacture on the same assembly line used for the trench manufacture. The same tools and labor can be employed. This effects a savings as compared to fabrication by an independent unit using its own tools and labor.

It will be readily apparent to those skilled in the art that with slight modification of components, a connector can be constructed for use with a single adjust trench. For example, modifications to the structure of FIG. 1 as commented on following.

The side rails 6, 31 and 32 are eliminated from a single adjust structure. Also, the side pieces 3, 16 and 17 are modified simply by adding a vertical screed flange to the horizontal flange. Furthermore, on the side pieces the Riv-Nut assemblies for the initial adjust are eliminated. The corresponding hold-down and final adjust Riv-Nut assemblies are placed on the horizontal flange of the side pieces. The connecting devices 52 and 54 and the couplers 55, 64, 70 and 73 remain in the same position.

I claim:

1. In a trenchduct connector unit to provide a connection between two trenchduct runs oriented at an angle to one another, the subcombination comprising:
    a flat, rectangular shaped base;
    a first side piece disposed on one edge of the base, the first side piece comprising a riser extending normally, upwardly from the base and a flange extending outwardly from the top of the riser parallel to the base, the riser and flange being integral with the base by that an extension of the base having been bent to form the riser and flange;
    a second side piece disposed on an adjacent edge of the base and extending generally normal to the first side piece, the second side piece comprising a foot section welded to the base, a riser extending normally upwardly from one edge of the foot and a flange extending from the top of the riser overlying said foot and co-planar with first said flange and the riser including a portion bent back in the direction of the foot and the flange so as to be co-extensive therewith and extend therebetween, the bent-back portion and first said riser being spaced apart and parallel one another to form a side opening for alignment with the trench to which the connector unit is to be secured;
    a trench coupler on one side of said opening, the coupler being disposed in the space between the foot and flange of the second side piece and the coupler comprising a pair of spaced apart, flat, co-planar legs at least one of which is welded to the foot, a center section raised above the legs and having an upstanding coupling flange; and
    a trench connecting device on the other side of said opening, the device being welded to the outside of first said riser, and having a coupling flange co-planar with the first said coupling flange, said coupling flanges being for use in respectively abutting coupling flanges on trench connecting devices on the trench with which said opening is aligned.

2. A construction in accordance with claim 1 further including:
    a first side rail disposed above said first side piece, the side rail comprising a side leg disposed closely adjacent the riser of the first side piece, a flange overlying the flange of the first side piece and a screed flange extending upwardly from the flange of the first side rail;
    means on the flange of the first side piece supporting the first side rail and providing for vertical adjustment of the first side rail with respect to the first side piece;

a second side rail disposed above said second side piece, the side rail comprising a side leg disposed closely adjacent the riser of the second side piece, a flange overlying the flange of the second side piece and a screed flange extending upwardly from the flange of the second side rail, the side leg including a portion bent back and extending generally parallel to and co-extensive with the bent-back portion of the riser of said second side piece; and means on the flange of the second side piece supporting the second side rail and providing for vertical adjustment of the second side rail with respect to the second side piece.

3. In a trenchduct connector unit to provide a connection between two trenchduct runs oriented at an angle to one another, the subcombination comprising:

a flat, rectangular shaped base;

a first side piece disposed on one edge of the base, the first side piece comprising a foot welded to the base, a riser extending normally upwardly from one edge of the foot and a flange extending from the top of the riser parallel the base and overlying said foot and the riser having a portion bent back in the direction of the foot and the flange so as to be co-extensive therewith and extend therebetween;

a second side piece disposed on the same edge of the base as the first side piece, the second side piece comprising a foot welded to the base, a riser extending normally upwardly from one edge of the foot and a flange extending from the top of the riser and overlying the foot, the riser having a portion bent back in the direction of the foot and the flange so as to be co-extensive therewith and extend therebetween, said bent-back portion on the first side piece and the bent-back portion on the second side piece being spaced apart and parallel to one another to form a side opening for alignment with the trench to which the connector unit is to be secured, said risers and flanges being respectively co-planar;

a trench coupler on one side of said opening, the coupler being disposed in the space between the foot and flange of the first side piece and the coupler comprising a pair of spaced apart, flat, co-planar legs at least one of which is welded to the foot and one of which is adjacent the bent-back portion of the riser of the first side piece and a center section raised above the legs and having an upstanding coupling flange; and a second trench coupler on the other side of said opening, the second coupler disposed in the space between the foot and flange of the second side piece, the second coupler comprising a pair of spaced apart legs at least one of which is welded to the foot and one of which is adjacent the bent-back portion of the riser of the second side piece and a center section raised above the legs and having an upstanding coupling flange co-planar with first said coupling flange, the coupling flanges being for use in respectively abutting coupling flanges on trench connecting devices on the trench with which said opening is aligned.

4. A construction in accordance with claim 3 further including:

a first side rail disposed above said first side piece, the side rail comprising a side leg disposed closely adjacent the riser of the first side piece, a flange overlying the flange of the first side piece and a screed flange extending upwardly from the flange of the first side rail, the side leg including a portion bent back and extending generally parallel to and co-extensive with the bent-back portion of the riser of said first side piece;

means on the flange of the first side piece supporting the first side rail and providing for vertical adjustment of the first side rail with respect to the first side piece;

a second side rail disposed above said second side piece, the side rail comprising a side leg disposed closely adjacent the riser of the second side piece, a flange overlying the flange of the second side piece and a screed flange extending upwardly from the flange of the second side rail, the side leg including a portion bent back and extending generally parallel to and co-extensive with the bent-back portion of the riser of said second side piece, the bent-back portion of the first side rail and the bent-back portion of the second side rail being spaced apart and parallel one another and extending into said opening;

means on the flange of the second side piece supporting the second side rail and providing for vertical adjustment of the second side rail with respect to the second side piece.

5. In a trenchduct connector unit to provide a connection between two trenchduct runs oriented at an angle to one another, the subcombination comprising:

a flat, rectangular shaped base, a first side piece disposed on one edge of the base, the first side piece comprising a foot section welded to the base, a riser extending normally upwardly from one edge of the foot and a flange extending from the top of the riser parallel said base and overlying said foot;

a second side piece disposed on the opposite edge of the base, and extending generally parallel to the first side piece, the second side piece comprising a foot section welded to the base, a riser extending normally upwardly from the foot and a flange extending from the top of the riser overlying the foot and co-planar first said flange, said risers being spaced from and parallel to one another to form an end opening for alignment with the trench to which the connector unit is to be secured;

a first trench coupler on one side of said opening, the coupler comprising a pair of spacedapart, flat, co-planar legs and a center section raised above the legs and having an upstanding coupling flange, one of the legs being welded to the foot section of the first said side piece and the upstanding coupling flange normal to the riser of said first side piece; and a second trench coupler on the other side of said opening, the coupler comprising a pair of spaced apart, flat, co-planar legs and a center section raised above the legs and having an upstanding coupling flange, one of the legs being welded to the foot section of said second side piece and the upstanding coupling flange being co-planar first said upstanding coupling flange, the coupling flanges being for use in respectively abutting coupling flanges on trench connecting devices on the trench with which said opening is aligned.

6. In a trenchduct connector unit to provide a connection between two trenchduct runs oriented at an angle to one another, the subcombination comprising:
a flat, rectangular shaped base,
a first side piece disposed on one edge of the base, the first side piece comprising a riser extending normally upwardly from the base and a flange extending outwardly from the top of the riser parallel to the base, the riser and flange being integral with the base by that an extension of the base having been bent to form the riser and flange;
a second side piece disposed on the opposite edge of the base and extending generally parallel to the first side piece, the second side piece comprising a foot section welded to the base and a riser extending normally upwardly from one edge of the foot and a flange extending from the top of the riser overlying said foot and co-planar with first said flange and the riser including a portion parallel to and spaced from first said riser to form an end opening for alignment with the trench to which the connector unit is to be secured;
a trench coupler on one side of said opening, the coupler being disposed in the space between the foot and flange of the second side piece, the coupler comprising a pair of spaced apart, flat, co-planar legs and a center section raised above the legs and having an upstanding coupling flange, one of the legs being welded to said foot so that the upstanding coupling flange is normal to the riser of the second side piece; and
a trench connecting device on the other side of said opening, the device being welded to the outside of the riser of first said side piece and having a coupling flange co-planar with first said coupling flange, said coupling flanges being for use in respectively abutting coupling flanges on trench connecting devices on the trench with which said opening is aligned.

* * * * *

UNITED STATES PATENT OFFICE
CERTIFICATE OF CORRECTION

Patent No. 3,753,585      Dated Aug. 21. 1973

Inventor(s) John P. Casto

It is certified that error appears in the above-identified patent and that said Letters Patent are hereby corrected as shown below:

Change the name of the assignee from "Textran" to -- Textron --.

Signed and sealed this 18th day of December 1973.

(SEAL)
Attest:

EDWARD M. FLETCHER, JR.
Attesting Officer

RENE D. TEGTMEYER
Acting Commissioner of Patents